Oct. 8, 1929.  W. G. ALLEN  1,730,961
METHOD OF VENTING AND SEALING CANS
Filed Jan. 6, 1928
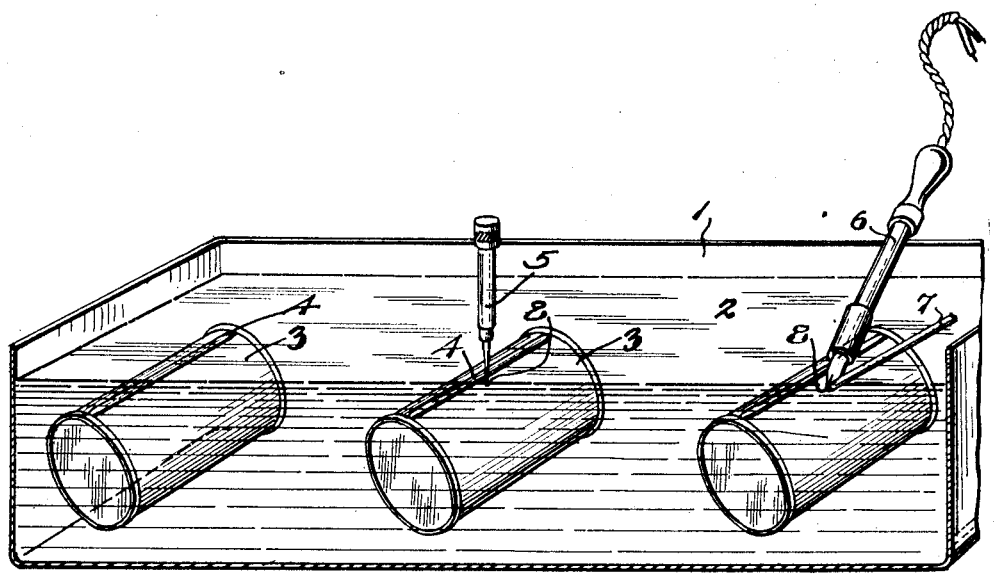
Inventor
W. G. Allen
By Robb & Robb
Attorneys Patented Oct. 8, 1929

1,730,961

UNITED STATES PATENT OFFICE

WILLIAM G. ALLEN, OF SALEM, OREGON

METHOD OF VENTING AND SEALING CANS

Application filed January 6, 1928. Serial No. 245,024.

This invention relates to a novel method of sealing cans in the art of preserving food products, these receptacles being the conventional tin cans used in the canning industry and has as its particular object, broadly stated, the sealing of a receptacle against the admission of air which would result in a deterioration or discoloration of the contents. The invention involves as an important feature the utilization of the heat imparted to the receptacle and its contents for rendering the sealing medium effective for sealing purposes.

More specifically, the method is adapted to the sealing of filled receptacles which have been vented to permit the escape or to drive off the gaseous content.

In the venting and sealing of canned food products, such as colored fruits, the admission of any air incident to the sealing causes discoloration of the fruit and a deterioration of the canned product. If any air be admitted during such venting and sealing it becomes necessary to subsequently sterilize the contents of the can which involves a further step in the canning method. It is therefore important that the venting of the heated can be effected without the admission of air and by a method which avoids the use of extensive mechanism, such as is necessary when venting in a vacuum.

The present novel method provides for heating the contents of the can to a proper temperature for their preservation, then venting the can when submerged in a liquid to permit the escape of any gas therefrom, and subsequently sealing the vent opening while still submerged in the liquid. These steps require the use of a special solder which may be applied to the vent while beneath a heated liquid body and remains in plastic coindition until cold or exposed to the air. This permits excess solder to be wiped from the can while submerged and collected in a vent tank for re-use.

A further novel step of the method consists in puncturing the can for venting, preferably through or adjacent to the extra thicknesses at the side seam thereof, which avoids any bending or denting of the can, and such puncturing is effected by a fine or needle point punch forming a very small opening adapted to be readily sealed and which is practically invisible in the finished product. The use of a heated fluid in the venting tank exhausts any gas from within the can when punctured and also controls the plastic condition of the solder used in sealing the can, it being comprehended as an important feature of my invention to employ a solder which has a melting point corresponding to the temperature of the fluid for heating the contents of the can.

The invention has for an object to present a novel method of canning a food product consisting in disposing the product in a sealed receptacle and puncturing the latter while within a heated fluid for the purpose of venting the container, and finally sealing the vent opening while within such fluid body.

Another object of the invention is to present a new method of canning a colored fruit product consisting in disposing the product in a receptacle and submerging the receptacle in a heated liquid, puncturing the receptacle while so submerged, and applying to the vent opening so formed a sealing composition adapted to remain plastic for a period at the temperature of the submerging liquid and to solidify upon a cooling of the receptacle.

A further object of the invention consists in presenting a continuous method of canning a food product involving the preliminary heating of the product in a sealed receptacle to a temperature necessary for preservation, the submerging of said receptacle in a heated fluid, the puncturing of the receptacle while so submerged to vent the same, and the sealing of said vent opening while still submerged.

A still further object of the invention is to provide a novel method of puncturing cans consisting in enclosing the same in a fluid body, puncturing the can at or adjacent to the side seam thereof and applying to the punctured opening a sealing composition.

Other and further objects and advantages of the method will be hereinafter set forth and the novel features thereof defined by the appended claims.

The drawings illustrates one means for effecting the method comprising the present invention, but various other and different means may be used for the same purpose, the showing being merely for the purpose of illustrating a simple apparatus for performing the venting and sealing operations.

In this drawing, the numeral 1 designates a tank adapted to receive a body 2 of heated liquid of sufficient depth to slightly submerge a tin can or receptacle 3 containing the food product to be preserved. In the practical application of the method these cans are preliminarily filled with the food product, such as colored fruits, and then sealed and further subjected to the necessary temperature for preservation of the product. They are then introduced into the venting tank 1 and submerged to a depth slightly below the liquid level thereof. The cans 3 are disposed with the thickened side seam 4 uppermost, all in convenient position for the puncturing or venting operation which is effected by means of a very small or needle punch 5 and applied preferably to the seam, or as shown at one side of the side seam 4. As this seam is of several thicknesses of material it strengthens and stiffens the side of the can so that the puncturing, as aforesaid, prevents any bending or denting of the can and leaves a clear-cut opening from which any gas within the can escapes, and such escape of gas is facilitated by the temperature of the liquid or fluid body beneath which the can is submerged. If a liquid be used, this is kept in a clean condition as it is possible that some may enter the can to replace the air or gas vented therefrom.

The vent opening formed at the side of the can is then sealed by the use of a special solder adapted to assume and remain in a plastic condition for a limited period beneath the liquid and to solidify when the can is removed or subjected to a lower temperature than that of the submerging liquid. Such soldering may be effected by any desired means and an instance thereof is shown by the electric iron 6 cooperating with a solder stick 7 for applying the solder at the vent opening 8 as shown in the drawing.

This method of sealing the can by the use of a solder or composition adapted to be applied beneath the fluid permits the removal of excess solder from the can before its withdrawal from the tank and such excess may be recovered from the bottom of the tank for re-use.

In carrying this method into effect it has been found desirable and important to provide a special solder which will remain in a plastic or putty-like condition for a limited period at the temperature of the liquid within which the food containers are submerged but will subsequently immediately harden or solidify if exposed to air or a materially lower temperature. As an example of a solder for such purpose it may be composed of the following ingredients:

8 ounces metallic bismuth.
4 ounces lead.
2 ounces block tin.
2 ounces cadmium.
3 drops of mercury (of the size of B—B shot).

I do not herein specifically claim the solder, particularly reserving the right to do so in a separate application or applications.

This formula and the proportions thereof are, however, subject to variation and dependent upon the various conditions of use. For instance, if it be desired to increase the melting point of the solder the proportion of block tin is increased, and if it be desired to lower such melting point an increase in the amount of cadmium is used. Likewise, if the fluxing qualities of the solder are not those desired, an increase in the quantity of mercury will assist in the fluxing condition.

The ingredients just mentioned, and the proportions thereof, are not to be considered as a definite necessary composition for the process of this invention because the scope of the invention contemplates the use of any sealing composition which can be applied beneath a liquid body and will remain in a plastic condition until exposed to the air or a lower temperature, whether such plastic condition is due to the heat applied by means of a soldering iron or by the liquid itself. In fact, as hereinbefore premised, I have discovered that it is possible to so compound my solder formula as to eliminate the necessity of using an iron or means other than the liquid used for heating the contents to exhaust the gas. For example, if it is desired to heat the contents of the can to 165° the solder used is such as to have its melting point at that temperature. In this way the solder may be applied to the heated surface of the can where the opening has been made and a small amount will melt much like the principle of a certain amount of pencil lead will come off when brought into contact with paper.

The temperature of the liquid in the venting tank is approximately 165° but it may be varied also under different conditions of use and the actual temperature of such liquid will control the composition of the sealing medium. If water be used it should be previously boiled or sterilized because of the possibility of a slight quantity entering a can between the puncturing and sealing thereof and replacing the gas or air vented from the can. If it be found that the solder solidifies too quickly beneath the liquid, an increase in the temperature of the liquid in the venting tank will cause the solder to remain in a plastic condition for a longer period, so that both the temperature of the liquid beneath which the venting occurs and of the sealing composition are variable dependent upon conditions of practical use.

The invention provides a very simple and efficient venting and sealing method particularly adapted for use in canning colored fruits such as loganberries and red raspberries where there is frequently a discoloration due to the presence of air or its admission during the venting operation.

While the method has been shown as being manually effected, it is capable of embodiments in an automatic machine provided with the proper elements for effecting the successive steps thereof. Also, while the sealing of the receptacle by means of the plastic solder has been above described as applied to the vent opening, the invention contemplates the use of such sealing at any desired point or opening of the can when enclosed in a fluid medium to prevent the entrance of air into the can opening.

The successive steps of the method have been specifically described but the invention is not confined thereto as changes and alterations may be made contingent upon the character of product to be canned and the receptacle used for that purpose, so that the invention is not confined to the specific steps hereinbefore stated.

Having thus described my invention, what I claim as new and desire to secure by Letters Patent is:—

1. The method of canning a food product consisting in disposing the product in a sealed receptacle, enclosing the said receptacle in a heated fluid, puncturing the receptacle while so enclosed to vent the same, and sealing said vent with solder melted by said fluid while still enclosed.

2. The method of canning a food product consisting in disposing the product in a sealed receptacle, submerging said receptacle in a liquid, puncturing the receptacle while so submerged to vent the same, and sealing said vent opening while still submerged.

3. The method of canning a food product consisting in disposing the product in a sealed receptacle, submerging said receptacle in a lquid, puncturing the receptacle while so submerged to vent the same, sealing said vent opening while still submerged, and regulating the temperature of said liquid to control the plastic condition of the sealing composition.

4. The method of canning a food product consisting in disposing the product in a sealed receptacle, heating said receptacle to the temperature necessary to preserve said product, submerging said product in a heated liquid, puncturing the receptacle while so submerged to vent the same, and soldering said vent opening while still submerged.

5. The method of canning a food product consisting in disposing the product in a sealed receptacle, heating said receptacle to the temperature necessary to preserve said product, submerging said product in a heated liquid, puncturing the receptacle while so submerged to vent the same, soldering said vent opening while still submerged, removing excess solder while the receptacle is submerged, and finally cooling the receptacle to solidify the solder thereon.

6. The method of canning a food product consisting of disposing the product in a sealed receptacle, submerging said receptacle in a heated liquid, puncturing the receptacle through the side seam thereof, and applying a solder to the opening so formed.

7. The method of canning a food product consisting in disposing the product in a receptacle, enclosing said receptacle in a heated liquid, applying to an opening in said receptacle a metallic solder adapted to remain plastic for a period at the temperature of the liquid, and then cooling the receptacle to automatically solidify said solder 8. The method of canning food products which comprises heating the can and contents by a fluid medium to a predetermined temperature sufficient to expel the gases therein and impart to the can a soldering temperature, venting the can in said medium to exhaust the gaseous content, and applying to the vent a solder having a melting point corresponding to said predetermined temperature to seal the vent while in said medium.

9. The method of canning food products which comprises heating the can and contents to a predetermined temperature to impart gas expelling and soldering temperature thereto, venting the can to exhaust the gaseous content, and applying to the vent while preventing the admission of air thereinto a solder having a melting point corresponding to said predetermined temperature to thereby melt the solder and seal the vent.

10. The method of canning food products which comprises submerging the filled can in a liquid heated to a predetermined temperature, applying to a vent in said can a sealing solder having a melting point corresponding approximately to said temperature, and removing the can from the liquid to permit solidification of the solder.

In testimony whereof I affix my signature.

WILLIAM G. ALLEN.